(12) United States Patent
Gargaro et al.

(10) Patent No.: US 10,887,368 B2
(45) Date of Patent: Jan. 5, 2021

(54) MONITORING QUALITY OF A CONFERENCE CALL FOR MUTED PARTICIPANTS THERETO

(71) Applicant: INTERNATIONAL BUSINESS MACHINES CORPORATION, Armonk, NY (US)

(72) Inventors: Gianluca Gargaro, Rome (IT); Marco De Gregorio, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/284,095

(22) Filed: Feb. 25, 2019

(65) Prior Publication Data
US 2020/0274911 A1 Aug. 27, 2020

(51) Int. Cl.
*H04L 29/06* (2006.01)
*H04R 29/00* (2006.01)
*G10L 25/60* (2013.01)

(52) U.S. Cl.
CPC .............. *H04L 65/80* (2013.01); *G10L 25/60* (2013.01); *H04L 65/403* (2013.01); *H04R 29/00* (2013.01)

(58) Field of Classification Search
CPC ........ H04M 3/568; H04M 3/323; H04M 9/08; G06F 3/165
USPC ........... 379/1.01, 10.01, 15.01, 22.02, 27.03, 379/27.04
See application file for complete search history.

(56) References Cited

U.S. PATENT DOCUMENTS

| 6,212,275 B1 * | 4/2001 | Akhteruzzannan | ..... H04M 9/08 379/351 |
| 6,442,272 B1 | 8/2002 | Osovets | |
| 6,888,925 B2 * | 5/2005 | Spitzer | .................... H04M 3/24 379/1.01 |

(Continued)

FOREIGN PATENT DOCUMENTS

JP 2009171197 A 7/2009

OTHER PUBLICATIONS

Mell et al., "The NIST Definition of Cloud Computing", National Institute of Standards and Technology, Special Publication 800-145, Sep. 2011, pp. 1-7.

*Primary Examiner* — William G Trost, IV
*Assistant Examiner* — Christopher P Cardona
(74) *Attorney, Agent, or Firm* — Kristofer L. Haggerty

(57) ABSTRACT

A solution is proposed for monitoring quality of a conference call. Corresponding methods are implemented on a client computing machine of a participant to the conference call, a server computing machine for managing the conference call and a computing system comprising the server computing machine and a plurality of client computing machines, respectively. One or more test signals (having corresponding test frequencies within a human audible range) are generated by each client computing machine in the mute mode without audible effects on the participant. The test signals are transmitted from the client computing machine to the server computing machine. The server computing machine verifies the quality of the conference call for the participant according to a comparison of one or more received signals (received from the client computing machine) with the test signals. Computer programs and computer program products for performing the corresponding methods are also proposed.

14 Claims, 10 Drawing Sheets

(56) References Cited

U.S. PATENT DOCUMENTS

| | | | |
|---|---|---|---|
| 9,467,569 B2 | 10/2016 | Femal | |
| 2005/0207590 A1* | 9/2005 | Niehoff | G10K 15/02 |
| | | | 381/77 |
| 2008/0101619 A1* | 5/2008 | Shmunk | H04R 3/04 |
| | | | 381/59 |
| 2009/0204922 A1* | 8/2009 | Bhattacharjee | H04L 12/1827 |
| | | | 715/771 |
| 2013/0106977 A1 | 5/2013 | Chu et al. | |
| 2016/0367213 A1* | 12/2016 | Fujita | A61B 5/02028 |

\* cited by examiner

MONITORING QUALITY OF A CONFERENCE CALL FOR MUTED PARTICIPANTS THERETO

BACKGROUND

The present disclosure relates to the information technology field. More specifically, this disclosure relates to conference calls.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Conference calls (also known as teleconferences) are routinely used to communicate interactively among a plurality of persons, referred to as participants, with the aid of technical means. The conference calls may be used by participants in different locations, and particularly in remote locations that are dispersed geographically. Commonly, the conference calls are performed over the Internet (for example, by exploiting VOIP techniques), in which case they are also referred to as Internet or web conferences. The conference calls provide a live exchange of sounds among the participants (i.e., their voices); moreover, the conference call may also support the sharing of multi-media contents, such as video, images, data, documents and so on. The conference calls allow the participants to discuss topics of common interest in a time and cost effective way without the need of meeting face-to-face, which generally would require long travels by the participants to reach a common physical location.

The effectiveness of each conference call significantly depends on its quality; for example, with reference to corresponding audio channels of the participants (used to transmit/receive sounds), their integrity and fidelity is important to ensure that each participant speaking in the conference call is heard by all the other participants.

For this purpose, the quality of the audio channel of each participant may be verified when the participant enters the conference call. For example, the participant is asked to utter a test phrase. The test phrase is transmitted to a service provider, which returns it to the participant for its playing back. This allows the participant to verify whether the quality of the audio channel is satisfactory.

However, the quality of the conference call may change significantly after it has been verified at the beginning; indeed, the quality of the audio channel of each participant depends on several contingent factors that are relatively dynamic (such as a speed of a connection with the service provider, a corresponding network traffic and so on). The change of the quality may be critical when the participants are muted (to suppress their voices) after entering the conference call and they are unmuted (to speak into the conference call) only when their speaking turn arrive, which may happen after a relatively long time (especially when the conference call has a high number of participants). Another case is when at the beginning the conference call is set to a private mode that is open only to a restricted number of participants belonging to a panel of main speakers (for performing a briefing about a content of the conference call), whereas all the other participants are provided a waiting music or a registered message informing that the conference call will start shortly; once the briefing has been completed, the conference call is switched to a public mode wherein it is actually started for all the participants.

Therefore, it may happen that when a participant speaks into the conference call the quality of the corresponding audio channel has changed significantly from its verification at the moment of entering the conference call. Particularly, the quality of the audio channel may have worsened, for example, because of a reduction of the speed of the connection with the service provider and/or an increase of a corresponding network traffic (down to a complete break); in this case, the voice of the participant may become distorted, intermittent and/or noisy, so as to make it difficult, if not impossible, its understanding by the other participants.

All of the above significantly degrades the quality of the conference call. Particularly, a too low quality of the conference call may involve additional exchanges of information over a corresponding communication network (for example, for re-sending poor quality or completely lost portions of speeches), with a detrimental effect on its performance.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of monitoring the quality of the conference calls over time.

Particularly, an aspect provides methods for monitoring a quality of a conference call that are implemented on a client computing machine of a participant to the conference call, on a server computing machine managing the conference call and on a computing system comprising the server computing machine and a plurality of client computing machines, respectively. For this purpose, one or more test signals (having corresponding test frequencies within a human audible range) are generated by each client computing machine in the mute mode without audible effects on the corresponding participant. The test signals are transmitted from the client computing machine to the server computing machine. The server computing machine verifies the quality of the conference call for the participant according to a comparison of one or more received signals (received from the client computing machine) with the test signals.

Another aspect provides corresponding computer programs and computer systems for performing those methods.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). Particularly.

DETAILED DESCRIPTION

Figure 1A:
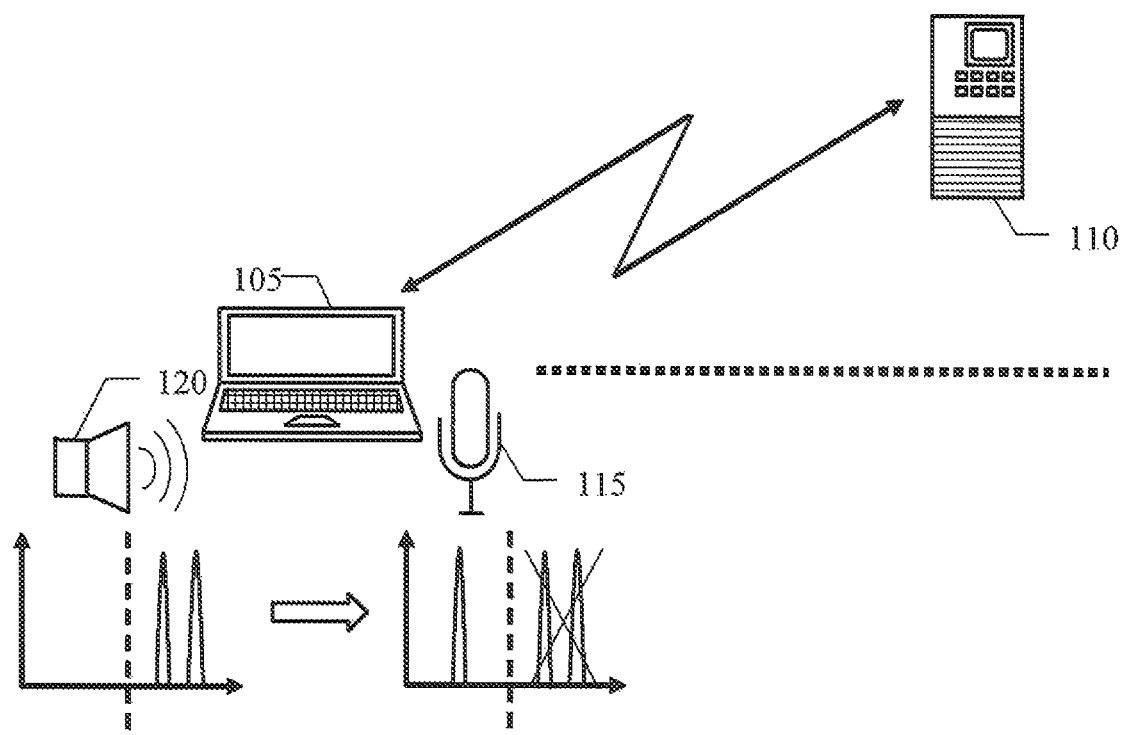
FIG. 1A-FIG. 1B show the general principles of the solution according to an embodiment of the present disclosure.
Figure 1B:
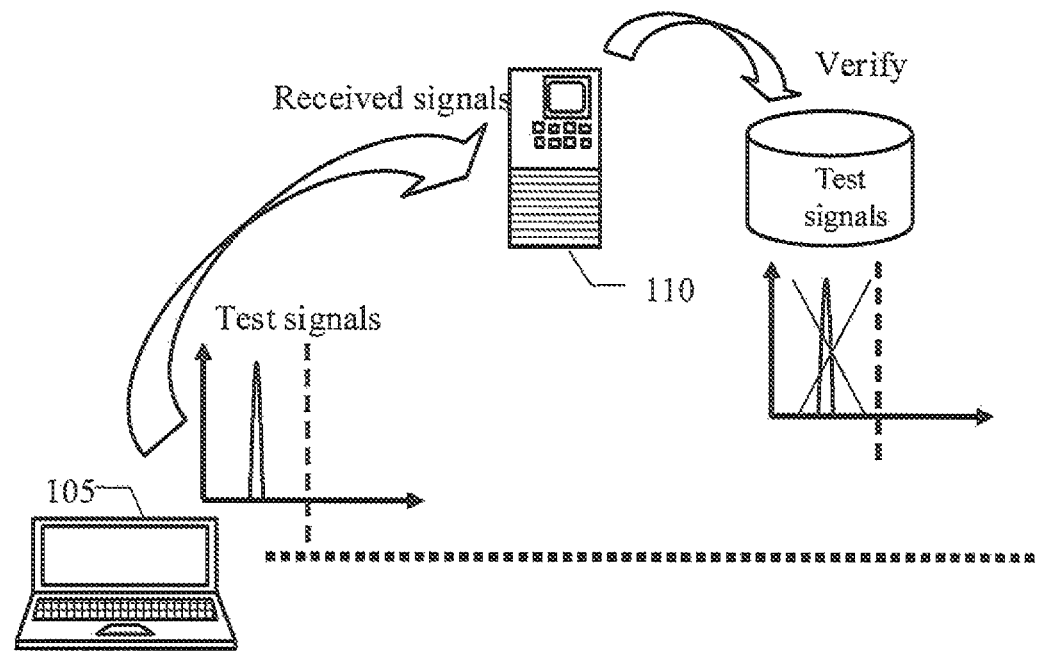

With reference in particular to FIG. 1A-FIG. 1B, the general principles are shown of the solution according to an embodiment of the present disclosure.

Starting from FIG. 1A, a conference call is implemented among a plurality of participants (for example, persons that are generally dispersed geographically so as to be remote one to another). For this purpose, each participant exploits a client computing machine, or simply client 105 (only one shown in the figure for brevity); the clients 105 communicate with a server computing machine, or simply server 110 that manages the conference call. Particularly, each client 105 comprises a microphone 115 for recording (input) sounds, and especially a voice of the participant when speaking in the conference call, to be distributed to the other participants and a loudspeaker 120 emitting (output) sounds, and especially the voice of the other participant that is currently speaking in the conference call.

Generally, the client 105 of each participant is set to a mute mode (either manually or automatically) when the participant is not speaking in the conference call. In the mute mode, the client 105 prevents (or at least substantially limits) the transmission to the server 110 of any input sound recorded by the microphone 115, comprising the voice of the participant, background noise and feedback sound from the loudspeaker 120; this avoids disturbing the hearing of the participant that is currently speaking in the conference call.

In the solution according to an embodiment of the present disclosure, each client 105 in the mute mode generates one or more test signals. The test signals are (audio) signals that represent corresponding sounds. The test signals (i.e., the corresponding sounds) have (test) frequencies that are within a (human) audible range, which defines the frequencies that may be heard by human beings (in normal conditions). Conventionally, the audible range is defined from 20 Hz to 20 kHz; however, in practice the audible range varies considerably among different persons and over time for each person (for example, from 10-30 Hz to 15-30 kHz). In any case, the test signals are generated without audible effects on the participant. This means that the test signals are generated without the emission of any sound in the hearing range, or at most with the emission of sounds that are hardly perceivable by the participant (for example, having intensities below a threshold, such as from $5 \cdot 10^{-13}$ W/m² to $5 \cdot 10^{-11}$ W/m², like $10^{-12}$ W/m²).

In an embodiment, for this purpose the loudspeaker 120 emits a precursor sound; the precursor sound comprises one or more components (two in the example shown in the figure) that have corresponding (precursor) frequencies that are outside the audible range (represented by a dashed line in the figure), for example, two precursor tones at 40 kHz and 50 kHz. The precursor sound is recorded by the microphone 115, which converts it into a corresponding precursor (audio) signal. However, the microphone 115 distorts the precursor signal (because of its non-linearity outside the audible range); this creates a test signal that has a frequency within the audible range (for example, at 10 kHz resulting from a combination of second harmonics of the precursor tones). The mute mode is then configured to pass the frequency of the test signal (whereas any other frequencies in the audible range are still suppressed).

Moving to FIG. 1B, each client 105 in the mute mode transmits the test signals to the server 110. The server 110 verifies the quality of the conference call for the participant of the client 105 according to a comparison of the received (audio) signals that are received by the client 105 with the corresponding test signals (which are expected). For example, when the test signals in a specific range of frequencies are cut in the received signals, it is possible to ascertain that the fidelity of a corresponding audio channel (between the client 105 and the server 110) is low; moreover, when the test signals are completely missing in the received signals, it is possible to ascertain that the audio channel is broken. At the same time, the server 110 prevents the test signals to be transmitted to the other clients 105, for example, by suppressing them from the received signals that are broadcast thereto (so as to avoid adding a corresponding noise to the voice of the participant that is currently speaking in the conference call).

The above-described solution allows monitoring the quality of the conference call continually for every participant (when the corresponding client 105 is in the mute mode). This result is achieved without any substantial side effect (since no audible sound is added to the conference call).

As a result, it is possible to known whether the quality of the conference call is satisfactory for every participant at any moment during the whole conference call. This is especially advantageous when the participants remain muted for a long time after entering the conference call (until their speaking turn arrives), for example, in case of high number of participants or of a briefing open to a restricted number of participants only before the actual starting of the conference call. As a result, it is possible to react accordingly right away. For example, when the fidelity of the audio channel is too low, the participant may wait for its improvement before speaking in the conference call; therefore, assuming that this is a temporary phenomenon (for example, due to a brief reduction of a speed of the connection with the server 110 or to a peak of a corresponding network traffic), is it possible to avoid having the voice of the participant distorted, intermittent and/or noisy (and then difficult to understand by the other participants). Moreover, when the audio channel is broken, the participant may re-connect to the conference call immediately; therefore, it is possible to limit the portion of speech that is lost by the participant.

All of the above significantly improves the quality of the conference call. Moreover, this limits additional exchanges of information over a corresponding communication network when the quality of the conference call is too low (for example, for re-sending poor quality or completely lost portions of speeches), which a beneficial effect on the performance of the communication network.

Figure 2:
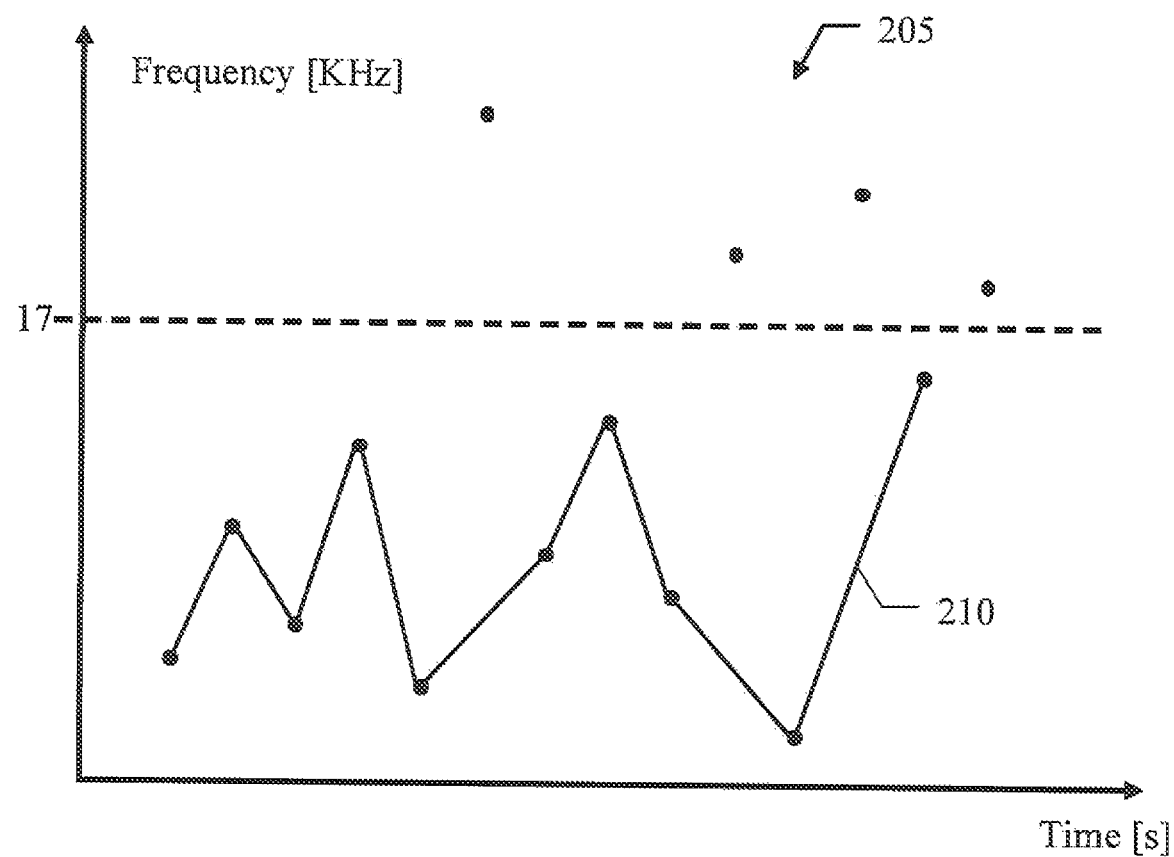
FIG. 2 shows an example of application of the solution according to an embodiment of the present disclosure.

With reference now to FIG. 2, an example is shown of application of the solution according to an embodiment of the present disclosure.

Particularly, the frequencies of the test signals that are generated and transmitted by a generic client to the server are represented by corresponding points 205 in a diagram plotting the frequencies (in [KHz]) on the ordinate axis against time (in [s]) on the abscissa axis. The frequencies of the test signals change continually over time throughout the whole audible range; in this way, it is possible to obtain a full coverage of the audio channel of the participant for its verification. The corresponding received signal is represented in the same diagram with a broken line 210.

In the example at issue, the test signals having their frequencies above 17 KHz are always missing in the received signals. This means that the audio channel cuts the components of the input sounds above this frequency; this may distort, make intermittent and/or noisy the voice of the participant should s/he speak in the conference call.

Figure 3:
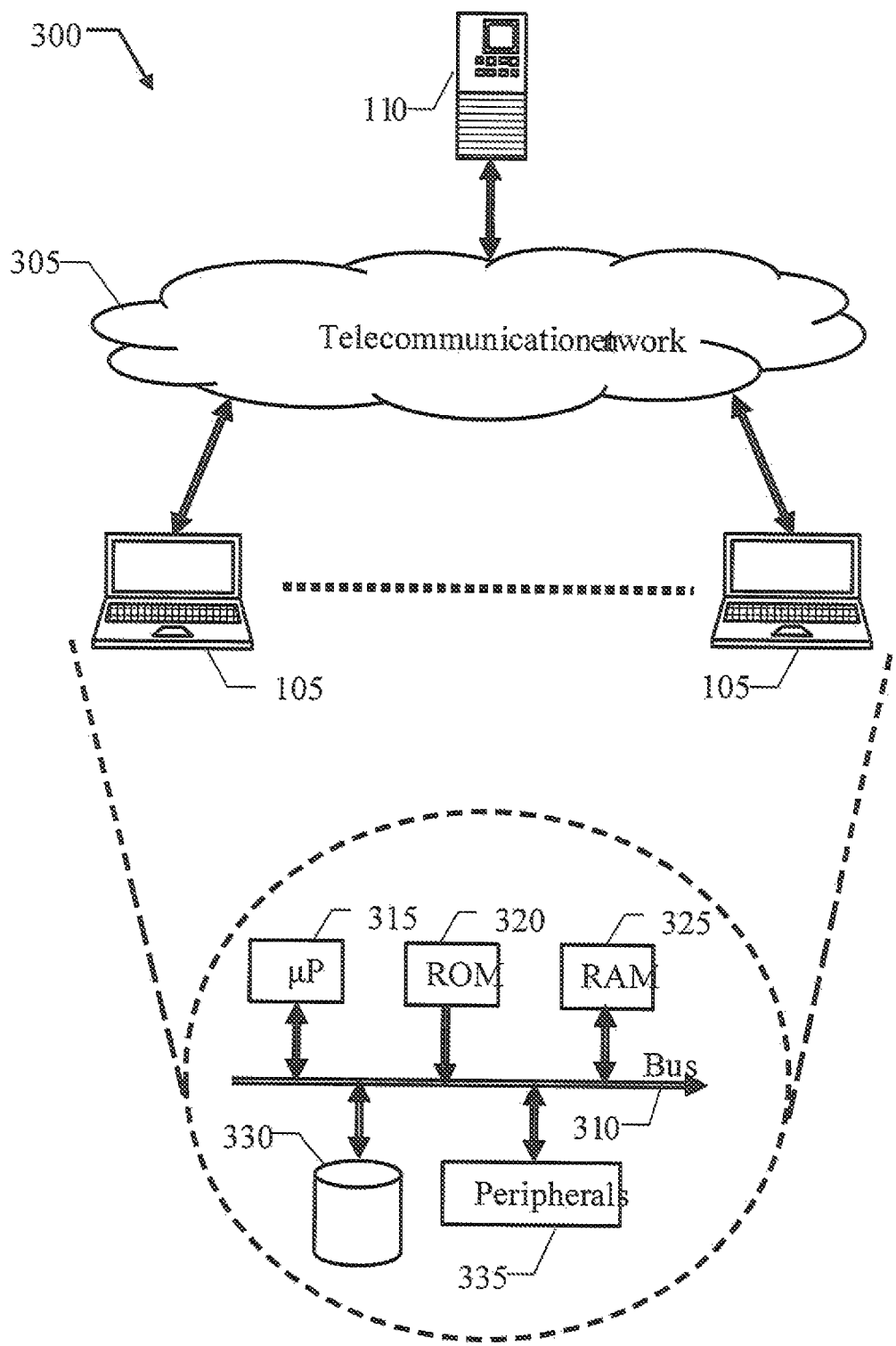
FIG. 3 shows a schematic block diagram of an infrastructure wherein the solution according to an embodiment of the present disclosure may be practiced.

With reference now to FIG. 3, a schematic block diagram is shown of an infrastructure 300 wherein the solution according to an embodiment of the present disclosure may be practiced.

The infrastructure 300 comprises the clients 105 and the server 110. For example, each client 105 may be a Personal Computer (PC) of the corresponding participant or a dedicated workstation installed in a conference room, whereas the server 110 may be implemented in a data center of a service provider offering a conference call service. The clients 105 and the server 110 are connected to a telecommunication network 305 (for example, based on the Internet) for communicating among them.

Each computing machine consisting of one the clients 105 or of the server 110 comprises several units that are connected among them through a bus structure 310 at one or more levels (with an architecture that is suitably scaled according to the type of the computing machine 105,110). Particularly, one or more microprocessors (μP) 315 control operation of the computing machine 105, 110; a non-volatile memory (ROM) 320 stores basic code for a bootstrap of the computing machine 105, 110 and a volatile memory (RAM) 325 is used as a working memory by the microprocessors 315. The computing machine 105, 110 is provided with a mass-memory 330 for storing programs and data (for example, a hard disk for the client 105 and storage devices of the data center for the server 110). Moreover, the computing machine 105, 110 comprises a number of controllers for peripherals, or Input/Output (I/O) units, 335; for example, the peripherals 335 of the client 105 comprise a drive for reading/writing removable storage units, such as optical disks like DVDs, a network interface card (NIC) for connecting to the communication network 305, a keyboard for entering commands/data, the above-mentioned microphone and loudspeaker, a monitor for displaying images and a mouse for selecting items on the monitor, whereas the peripherals 335 of the server 110 comprise a network interface card for plugging into the data center, and then connecting the server 110 to a console of the data center for its control (for example, a personal computer provided with a drive for reading/writing removable storage units as above) and to a switch/router sub-system of the data center for its communication with the telecommunication network 305.

Figure 4:
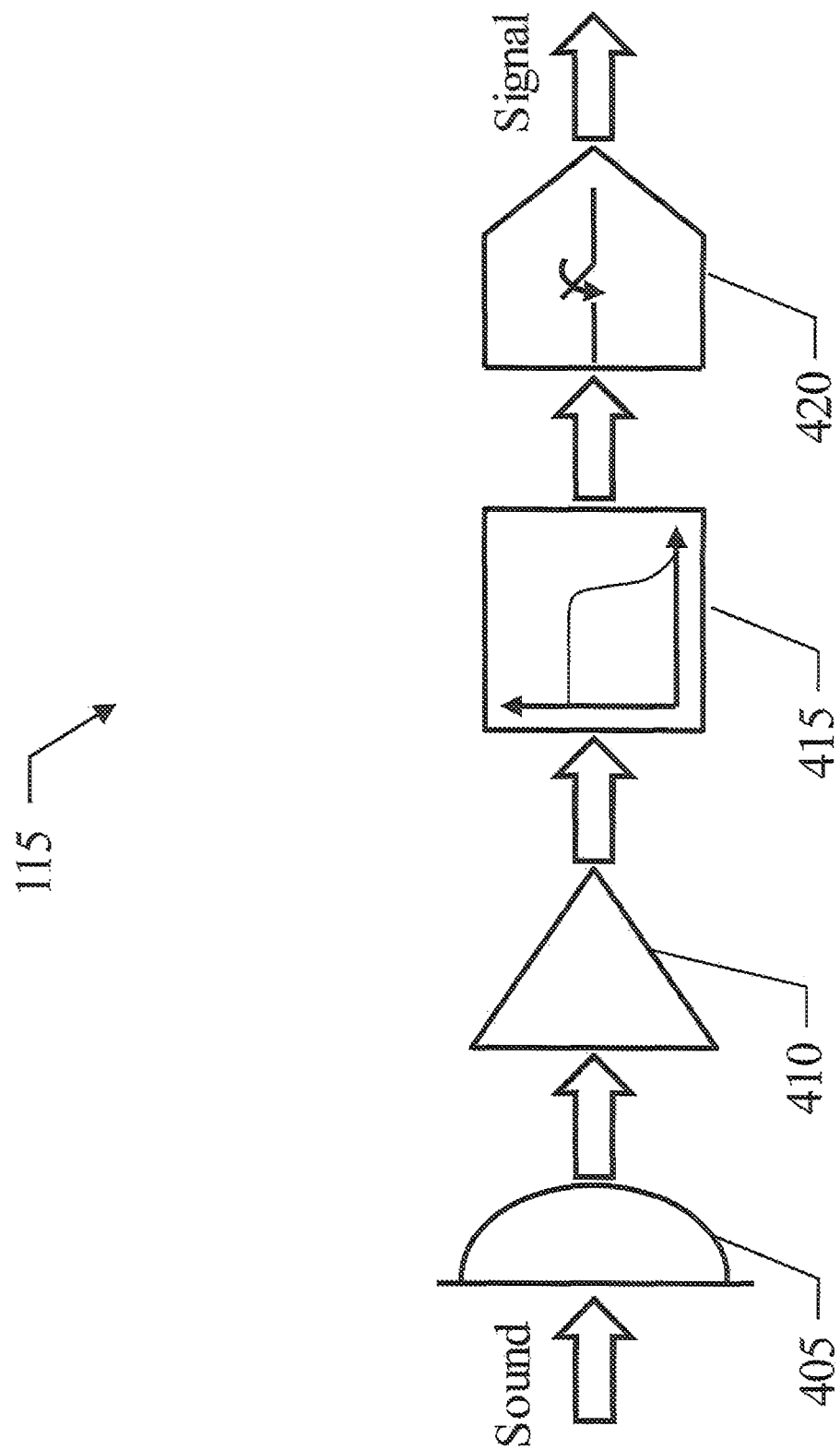
FIG. 4 shows a schematic block diagram of a microphone that may be used to implement the solution according to an embodiment of the present disclosure.

With reference now to FIG. 4, a schematic block diagram is shown of the microphone 115 that may be used to implement the solution according to an embodiment of the present disclosure.

The microphone 115 comprises the following components. A transducer 405 receives sounds (i.e., pressure waves generated by vibrations) and converts them into corresponding analog (audio) signals of electric type (for example, a voltage varying accordingly in amplitude). A pre-amplifier 410 amplifies the analog signal by increasing its power (relatively weak) to a level enough for further processing. A low-pass filter 415 filters the (amplified) analog signal by substantially attenuating (for example, by 30-100 dB) its components with frequencies higher than a cutoff value equal to an upper end of the audible range (for example, 20-25 kHz). An Analog-To-Digital (ADC) converter 420 converts the (filtered) analog signal into a corresponding digital (audio) signal.

The transducer 405 and the pre-amplifier 410 have a transfer characteristic that is not linear above the audible range, and then causes a corresponding harmonic distortion. Particularly, the transfer characteristic may be represented with a power series. Therefore, for a generic sound Snd defined by a pure tone, i.e., a sinusoidal wave Snd=sin(ωt) having a frequency f=ω/2π>20-25 KHz, the corresponding digital signal Sdg will be:

$$Sdg = \sum_{i=1}^{\infty} A_i \sin^i(\omega t) \quad \text{Eq. 1}$$

wherein $A_i$ are corresponding gains generally decreasing with the exponent i. The digital signal Sdg comprises a fundamental (of first harmonic) component depending linearly on the sound Snd and then at the same (fundamental) frequency thereof (f); moreover, the digital signal Sdg comprises harmonic components (or overtones) depending on powers of increasing exponent of the sound Snd and then at higher orders (harmonic) frequencies that are positive integer multiples (by their orders defined by the corresponding exponents) of the fundamental frequency (i.e. i·f). Generally, the harmonic components of order higher than 2 are negligible in practice, so that the distortion may be considered limited to the second harmonic (component):

$$Sdg = A_1 \sin(\omega t) + A_2 \sin^2(\omega t) \quad \text{Eq. 2}$$

Figure 5:
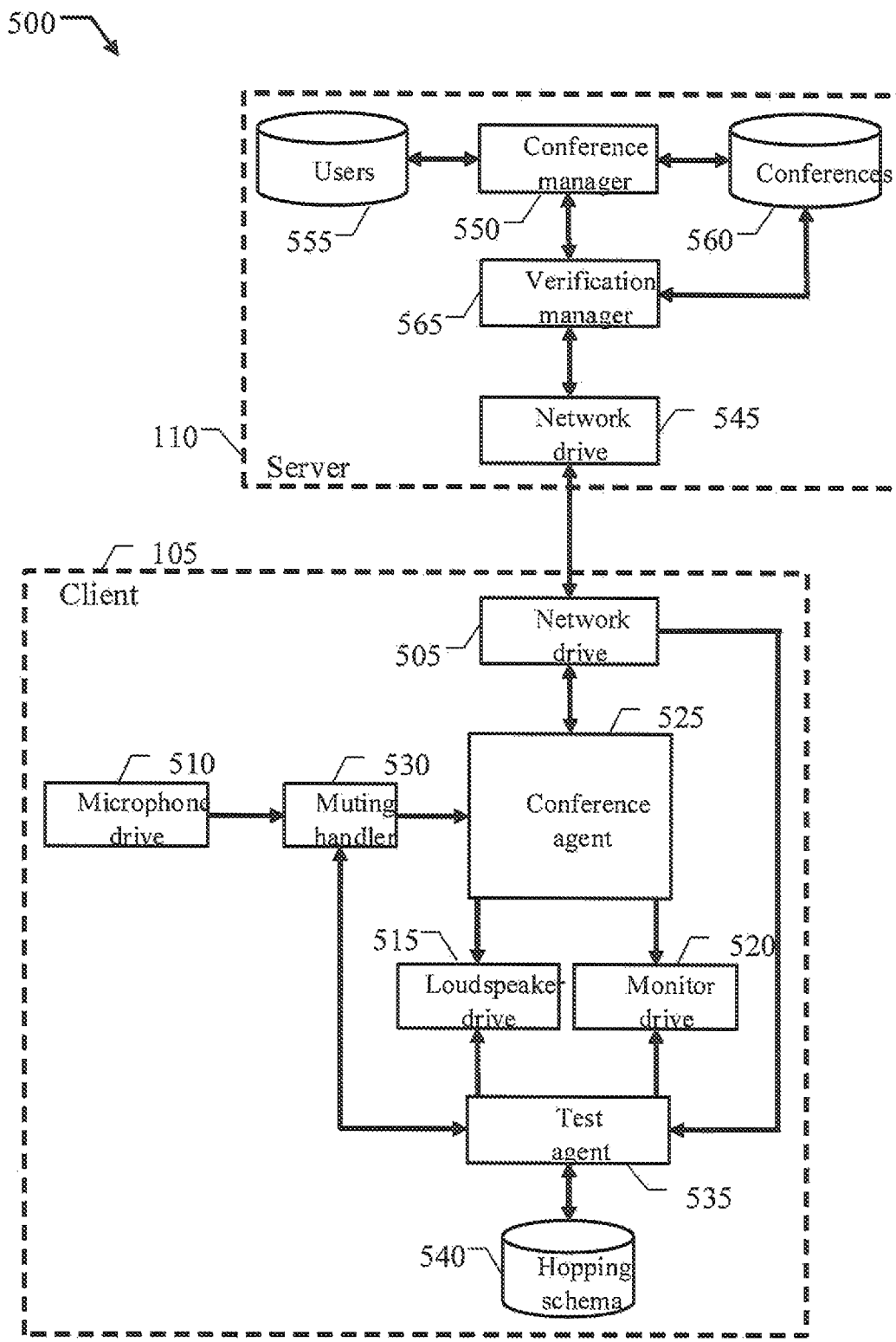
FIG. 5 shows the main software components that may be used to implement the solution according to an embodiment of the present disclosure.

With reference now to FIG. 5, the main software components are shown that may be used to implement the solution according to an embodiment of the present disclosure.

Particularly, all the software components (programs and data, implementing a conference application for performing conference calls over the telecommunication network) are denoted as a whole with the reference 500. The software components are typically stored in the mass memory and loaded (at least in part) into the working memory of each computing machine 105, 110 when the programs are running. The programs are initially installed into the mass memory, for example, from removable storage units or from the telecommunication network. In this respect, each program may be a module, segment or portion of code, which comprises one or more executable instructions for implementing the specified logical function.

Starting from each client 105 (only one shown in the figure), it comprises the following software components.

A network drive 505 drives the network interface card, a microphone drive 510 drives the microphone, a loudspeaker drive 515 drives the loudspeaker and a monitor drive 520 drives the monitor of the client 105. A conference agent 525 controls a conference call that is in progress on the client 105 by a participant using it; for this purpose, the conference agent exposes a user interface, which may be used by the participant to control the conference call. The conference agent 525 interacts with the network drive 505, it exploits (indirectly) the microphone drive 510 and it controls the loudspeaker drive 515 and the monitor drive 520. A muting handler 530 controls the muting/unmuting of the participant in the conference call. The muting handler 530 is interposed between the microphone drive 510 and the conference agent 525. In the solution according to an embodiment of the present disclosure, a test agent 535 controls the test signals used to verify the quality of the conference call for the participant of the client 105. The test agent 535 interacts with the muting handler 530, it exploits the network drive 505, and it controls the loudspeaker drive 515 and the monitor drive 520. Moreover, the test agent 535 accesses (in read/write mode) a test repository 540. The test repository 540 stores an indication of a hopping schema for the test signals. The hopping schema indicates when the test signals are generated and how their frequencies are determined. For example, the test signals are generated periodically (with a pre-defined test period, for example, every 0.1-0.5 s after setting the client 105 to the mute mute) and their frequencies are determined according to a pre-defined changing algorithm (for example, in a pseudo-random way throughout the audible range, such as with Frequency-Hopping Spread Spectrum, or FHSS, techniques) starting from a seed value; in this case, assuming that both the test period and the changing algorithm are known to the server 110 and to all the clients 105, the hopping schema is defined simply by the seed value.

Moving to the server 110, it comprises the following software components.

A network drive 545 drives the network interface card of the server 110 (for interacting with the network drive 505 of all the clients 105). A conference manager 550 provides the conference call service to the clients 105 by controlling any conference calls that are in progress centrally. The conference manager 550 interacts (indirectly) with the network drive 545. Moreover, the conference manager 550 accesses (in read/write mode) a user repository 555 and a conference repository 560. The user repository 555 stores information about persons registered as users of the conference manager 550 for exploiting the conference call service offered by it; for example, the user repository 555 comprises a record for each user, which record indicates its name, credentials, network address of the corresponding client 105 (if static), possible billing data and so on. The conference repository 560 stores information about any conference calls that are in progress. For example, the conference repository 560 comprises a record for each conference call (in progress), which record indicates its participants; in turn, for each participant the record indicates the network address of the corresponding client 105 (if dynamic) and its current mode (mute/unmute). In the solution according to an embodiment of the present disclosure, the conference repository 560 further indicates the hopping schema of the client 105 of each participant that is in the mute mode (i.e., its seed value for the changing algorithm). A verification manager 565 controls the verification of the quality of the conference calls that are in progress. The verification manager 565 is interposed between the network drive 545 and the conference manager 550, and it accesses (in read/write mode) the conference repository 560.

Figure 6A:
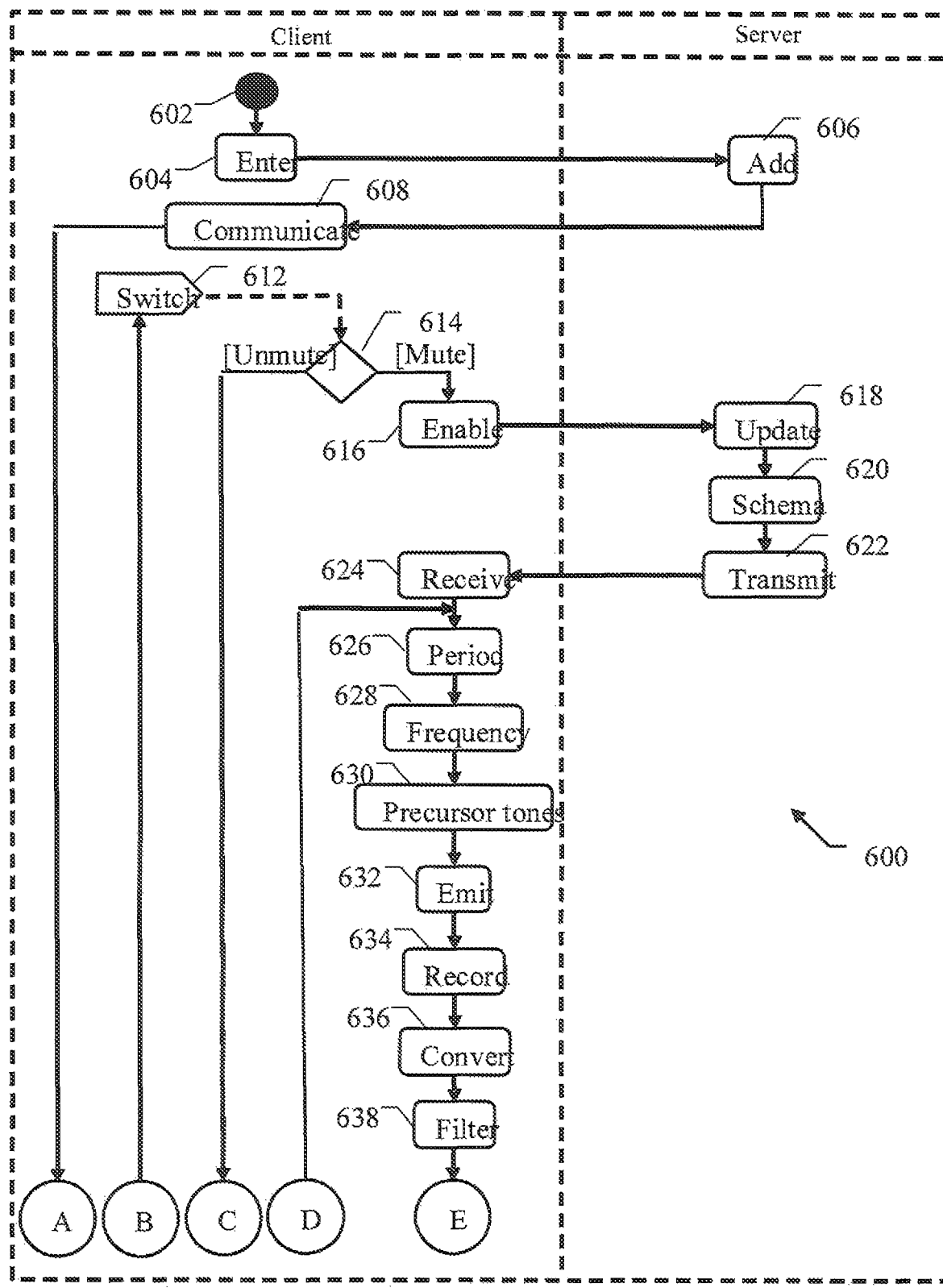
FIG. 6A-FIG. 6B show an activity diagram describing the flow of activity relating to an implementation of the solution according to an embodiment of the present disclosure.
Figure 6B:
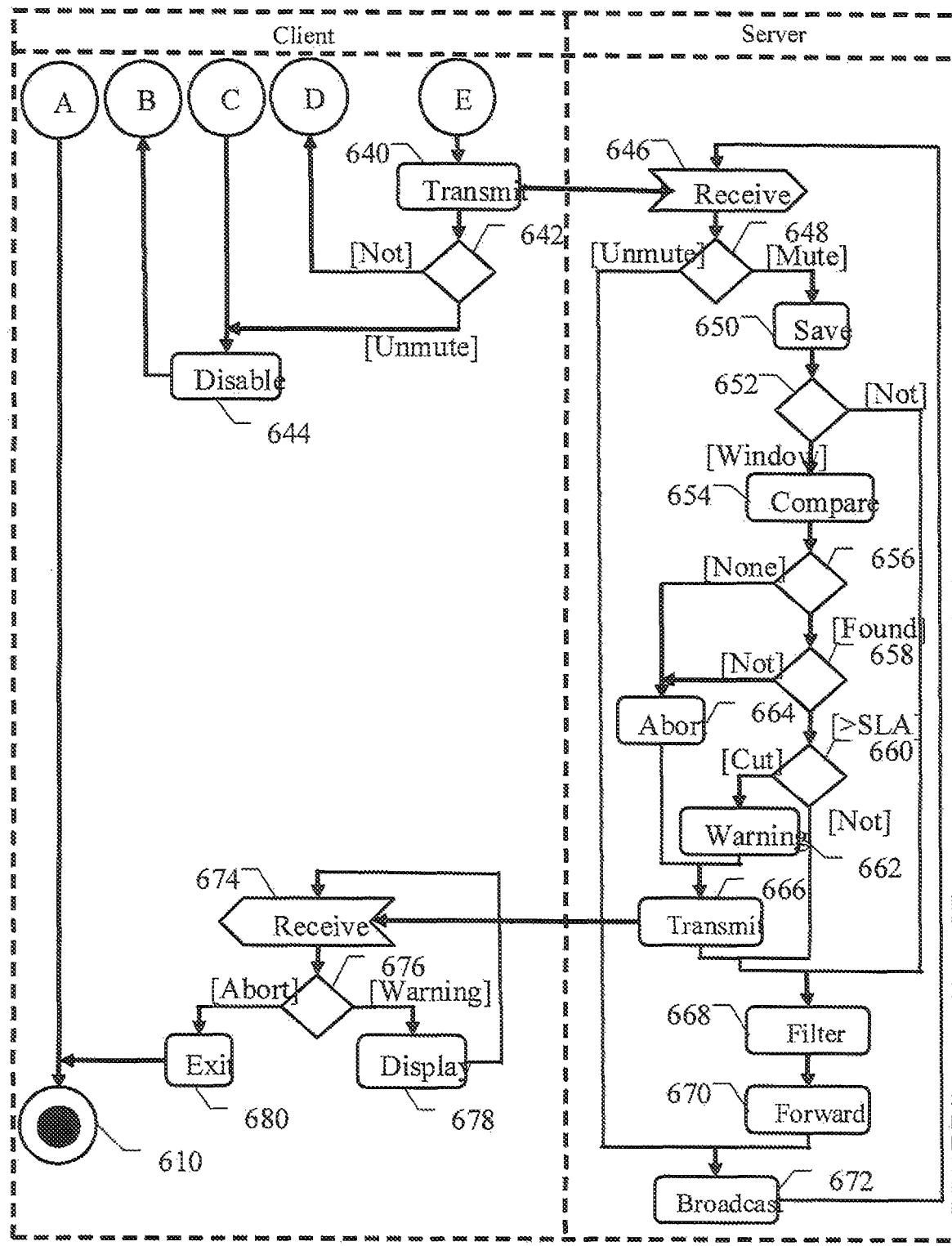

With reference now to FIG. 6A-FIG. 6C, an activity diagram is shown describing the flow of activity relating to an implementation of the solution according to an embodiment of the present disclosure.

Particularly, the activity diagram represents an exemplary process that may be used to control a conference call with a method 600. In this respect, each block may correspond to one or more executable instructions for implementing the specified logical function on the corresponding computing machine.

Starting from the swim-lane of a generic client, the process begins at the start block circle 602 and then passes to block 604 as soon as the user of the client enters a conference call (as participant thereto) as usual; for example, the user exploits the conference agent to authenticate with the conference manager and then to submit a corresponding request to the conference manager or to accept a corresponding request received from the conference manager. Moving to the swim-lane of the server, the conference manager at block 606 adds the user as participant to the conference call in the corresponding record of the conference repository. Returning to the swim-lane of the client, the conference agent at block 608 controls the conference call as usual (allowing the participant to communicate with the other participants by speaking and/or hearing their speech). The process ends at the concentric white/black stop circles 610 once the involvement in the conference call has been terminated for the participant; for example, this occurs in response to a manual command entered by the participant into the user interface of the conference agent (to abandon the conference call) or to a command received from the conference manager (for example, to exclude the participant from the conference call or to close it).

As far as relevant to the present disclosure, during the conference call the conference agent is in a waiting condition at block 612 for any switching of the (mute/unmute) mode of the client (detected by monitoring the muting handler or by receiving a corresponding notification from it); for example, this occurs in response to a manual command entered by the participant into the user interface of the conference agent, to a command received from the conference manager, automatically according to a behavior of the participant and so on. In response thereto, the flow of activity branches at block 614 according to a type of the switching.

Particularly, the process descends into block 616 when the client has been switched from the unmute mode to the mute mode; for example, this occurs automatically after the participant has entered the conference call, when the participant has terminated its speech, when a moderator of the conference call determines that the speaking turn of the participant has ended, when the participant has not spoken for a predefined time and so on. In response thereto, the muting handler enables a muting function. Normally, the muting function is implemented by a (digital) filter that suppresses, or at least substantially attenuates, for example, by 30-100 dB (at least within the audible range) the digital signal that is provided by the microphone drive (and then transmitted by the conference agent via the network drive to the server). Moving to the swim-lane of the server, the conference manager at block 618 updates the corresponding record in the conference repository by setting the mode of the participant of the client to mute. In the solution according to an embodiment of the present disclosure, the switching of the participant to the mute mode is intercepted by the verification manager at block 620; in response thereto, the verification manager sets the hopping schema for the client and saves an indication thereof in association with the participant of the client into the corresponding record of the conference repository; particularly, when the hopping schema is defined by a pre-determined test period (for the generation of the test signals) and a pre-determined changing algorithm (for the determination of their frequencies), the hopping schema is set by simply choosing its seed value (for example, in a pseudo-random way). Therefore, the corresponding test signals of different clients in the mute mode will generally be out of phase. Moreover, the frequencies of the test signals of each client in the mute mode will be substantially unique for the client during the conference call; therefore, the frequencies of the test signals of all the clients in the mute mode will be generally different one to another at any moment. All of the above avoids (or at least significantly reduces) any risk of overlapping of the test signals from different clients. The verification manager at block 622 transmits (via the network drive) the indication of the hopping schema (i.e., its seed value) to the client. With reference again to the swim-lane of the client, the test agent at block 624 receives (via the network drive) the indication of the hopping schema and saves it into the test repository. The test agent at block 626 waits for an expiry of the test period (at the beginning, from a starting time synchronized between the client and the server). As soon as the test period expires, the test agent at block 628 determines the frequency $f_T=\omega_T/2\pi$ of a next test signal to be generated according to the hopping schema (by iterating the changing algorithm, starting from the seed value extracted from the test repository at the beginning). The test agent at block 630 determines a precursor sound to be used for generating that test signal. For example, the precursor sound is a complex tone formed by two pure precursor tones. A first (pure) precursor tone is a sinusoidal wave $S_1=\sin(\omega_1 t)$ having a fixed frequency $f_1=\omega_1/2\pi$ above the audible range (for example, $f_1=35$-$45$ kHz). A second (pure) precursor tone is a sinusoidal wave $S_2=\sin(\omega_2 t)$ having a frequency $f_2=\omega_2/2\pi$ equal to the frequency $f_1$ of the first precursor tone plus the desired frequency $f_T$ of the test signal ($f_2=f_1+f_T$); for example, when the frequency of the first precursor tone is $f_1=40$ kHz and the frequency of the test signal is $f_T=10$ kHz, the frequency of the second precursor tone will be $f_2=40$ kHz+$10$ kHz=$50$ kHz.

The test agent at block 632 commands the loudspeaker drive to emit the precursor sound. As a consequence, the microphone at block 634 records the precursor sound. The microphone at block 636 converts the precursor sound into the corresponding digital (audio) signal, referred to as precursor signal. As pointed out above, the microphone distorts the precursor sound (because of its non-linearity above the audible range). Particularly, the precursor signal Spr (considering the second harmonic distortion only) will be:

$$Spr = A_1 \cdot (S_1 + S_2) + A_2 \cdot (S_1 + S_2)^2 =$$ Eq. 3

$$Spr = A_1 \cdot (\sin(\omega_1 t) + \sin(\omega_2 t)) +$$

$$A_2 \cdot \left( (\sin(\omega_1 t) + \sin(\omega_2 t))^2 \right) =$$

$$A_1 \cdot \sin(\omega_1 t) + A_1 \cdot \sin(\omega_2 t) + A_2 \cdot \sin^2(\omega_1 t) +$$

$$A_2 \cdot \sin^2(\omega_2 t) + 2 \cdot A_2 \cdot \sin(\omega_1 t) \cdot \sin(\omega_2 t) =$$

-continued $$A_1 \cdot \sin(\omega_1 t) + A_1 \cdot \sin(\omega_2 t) +$$

$$A_2 \cdot \left(1 - \frac{1+\cos(2\omega_1 t)}{2}\right) +$$

$$A_2 \cdot \left(1 - \frac{1+\cos(2\omega_2 t)}{2}\right) + 2 \cdot A_2 \cdot \frac{1}{2} \cdot$$

$$(\cos(\omega_1 - \omega_2)t) - \cos(\omega_1 + \omega_2)t) =$$

$$A_1 \cdot \sin(\omega_1 t) + A_1 \cdot \sin(\omega_2 t) + A_2 - \frac{A_2 \cdot \cos(2\omega_1 t)}{2} -$$

$$\frac{A_2 \cdot \cos(2\omega_2 t)}{2} + A_2 \cdot \cos((\omega_2 - \omega_1)t)) +$$

$$A_2 \cdot \cos((\omega_1 + \omega_2)t))$$

The precursor signal Spr then comprises the component $A_2 \cdot \cos((\omega_2-\omega_1)t)$ that is the test signal at the desired frequency $(\omega_2-\omega_1)/2\pi=f_2-f_1=f_1+f_T-f_1=f_T$ within the audible range, whereas all the other components have frequencies ($\omega_1$, $\omega_2$, $2\omega_1$, $2\omega_2$ and $(\omega_1+\omega_2)$) that are above the audible range. With reference to the above mentioned example (precursor tones at 40 kHz and 50 kHz), the precursor signal will comprise the test signal at 50-40=10 kHz and the other components at 40 kHz, 50 kHz, 2·40=80 kHz, 2·50=100 kHz and 40+50=90 kHz. The test agent at block 638 causes the muting handler to update the muting function so as to pass the precursor signal (received from the microphone drive) at the frequency $f_T$ of the test signal, still suppressing, or at least substantially attenuating, the precursor signal at the other frequencies, at least in the audible range, as above (for example, with the component of the precursor signal at the frequency $f_T$ of the test signal that is unaffected or at most negligibly attenuated, such as below 1-3 dB). Therefore, the conference agent will receive (from the muting handler) a (filtered) digital signal substantially consisting of the test signal only. In this phase, the test agent may also cause the muting handler to modulate the test signal with a pre-defined modulation technique (for example, in amplitude) according to a test message (for example, a fixed binary code). In any case, the conference agent at block 640 transmits (via the network drive) the test signal (possibly modulated) to the server as usual. In this way, the proposed solution is completely opaque to the operation of the conference agent. The test agent at block 642 verifies whether the client has been switched to the unmute mode. If not, the process returns to the block 626 to repeat the same operations at a next expiry of the test period.

With reference now to block 644, this point is reached from the block 614 or from the block 642 when the client has been switched from the mute mode to the unmute mode. For example, this occurs when the participant desires to speak, when the moderator determines that the speaking turn of the participant has been reached and so on. In response thereto, the muting handler disables the muting function. Therefore, the digital signal provided by the microphone drive (and then transmitted by the conference agent via the network drive to the server) now represents the whole input sound that is recorded by the microphone. The process then returns to the block 612 waiting for a next switching of the client to the mute mode.

Moving to the swim-lane of the server, the verification manager at block 646 intercepts (from the network drive) any received signals that are transmitted thereto by all the clients of the participants to the conference call. In response to each received signal, the verification manager at block 648 determines the mode (mute/unmute) of the corresponding client (as indicated in the corresponding record of the conference repository). If the client is in the mute mode, the blocks 650-670 are executed and the process then continues to block 672, whereas if the client is in the unmute mode the process directly descends into the block 672.

With reference now to the block 650 (mute mode), the conference manager adds the received signal to a verification register for the client (being empty at the beginning when the client is set to the mute mode); the verification register has a length corresponding to a verification window (for example, 2-10 s) ensuring the transmission of a significant number of test signals by the client (for the verification of the quality of the conference call for its participant). The verification manager at block 652 checks the verification register. If the verification register has been completed the blocks 654-666 are executed and the process then continues to block 668, whereas on the contrary the process directly descends into the block 668. With reference now to the block 654 (verification register completed), the required number of test signals have been received to cover the verification window; the verification manager then compares the received signals in the verification register with the test signals that are expected in the verification window from the client. For example, the verification manager determines the timing of the (expected) test signals according to the test period and their frequencies according to the hopping schema of the client (extracted from the corresponding record in the conference repository). The verification manager searches the test signals in the received signals around the corresponding instants (for example, +/−0.1 s). For each test signal that is found in the received signals, the verification manager demodulates it (according to the known modulation technique used by the client) so as to a recover a (received) message therefrom. The process branches at block 656 according to the test signals that are comprised in the received signals. If one or more test signals have been found in the received signals, the process continues to block 658. At this point, the verification manager determines a quality level provided by the received signals. For example, the quality level is defined according to a corresponding Service Level Agreement (SLA), such as by a percentage of the test signals that have been found in the received signals and by a percentage of their received messages that are equal to the verification message. The quality level is considered acceptable if both percentages are (possibly strictly) higher than corresponding thresholds (for example, 70-80%). In this case, the process continues to block 660 wherein the verification manager determines whether a (cut) range of frequencies of the test signals is continually missing in the received signals (for example, when a percentage of the missing test signals is, possibly strictly, higher than a corresponding threshold, such as 80-90%). If not, the received signals match the test signals (since substantially all the test signals have been found in the received signals and substantially all their received messages are equal to the verification message); in this case, the process directly descends into block 668 (after clearing the verification register). Conversely, if a cut range of frequencies is found in the received signals, the verification manager at block 662 determines that the quality of the conference call for the client does not reach a satisfactory level and then generates a corresponding warning message indicating a low quality of the conference call (for example, measured by a quality index calculated according to a percentage of the cut range with respect to the audible range). Referring back to the block 656, the process instead passes to block 664 when no test signal has been found in the received signals; the same point is also reached from the block 658 when the quality level is not considered acceptable, for example, when the percentage of the test signals that have been found in the received signals and/or the percentage of their received messages equal to the verification message are (possibly strictly) lower than the corresponding thresholds. In both cases, the verification manager determines that the quality of the conference call for the client does not reach an acceptable level. In response thereto, the verification manager causes the conference manager to abort the conference call for the participant (with the participant that is then deleted from the corresponding record in the conference repository); moreover, the verification manager generates a corresponding warning message indicating the abort of the conference call for the participant. The process then descends into block 666 from the block 662 or from the block 664. At this point, the verification manager transmits (via the network drive) the warning message to the client. The process then continues to the block 668 (after clearing the verification register). With reference now to the block 668, the verification manager suppresses, or at least substantially attenuates, the received signal within the audible range (for example, by 30-100 dB), so as to remove any test signal present therein. The verification manager at block 670 forwards the (filtered) received signal to the verification manager. The process then continues to the block 672.

With reference now to the block 672, the conference manager broadcasts the received signal (forwarded by the verification manager after filtering any test signal comprised therein when the client is in the mute mode or directly when the client is in the unmute mode) to the clients of all the other participants to the conference call (indicated in the corresponding record of the conference repository) as usual. In this way, the proposed solution is completely opaque to the operation of the conference manager. The process then returns to the block 646 waiting for a next received message.

With reference again to the swim-lane of the client, the conference agent at block 674 receives (via the network drive) any warning message from the server. In response thereto, the flow of activity branches at block 676 according to a type of the warning message. If the warning message indicates a low quality of the conference call for the participant, the conference agent at block 678 causes the monitor drive to display a corresponding notification (for example, indicating the quality index comprised in the warning message). The process then returns to the block 674 waiting for a next warning message. Conversely, if the warning message indicates that the conference call has been aborted for the participant, the conference at block 680 closes (possibly, after the conference agent has caused the monitor drive to display a corresponding notification). The process then ends at the concentric white/black stop circles 610.

Figure 7:
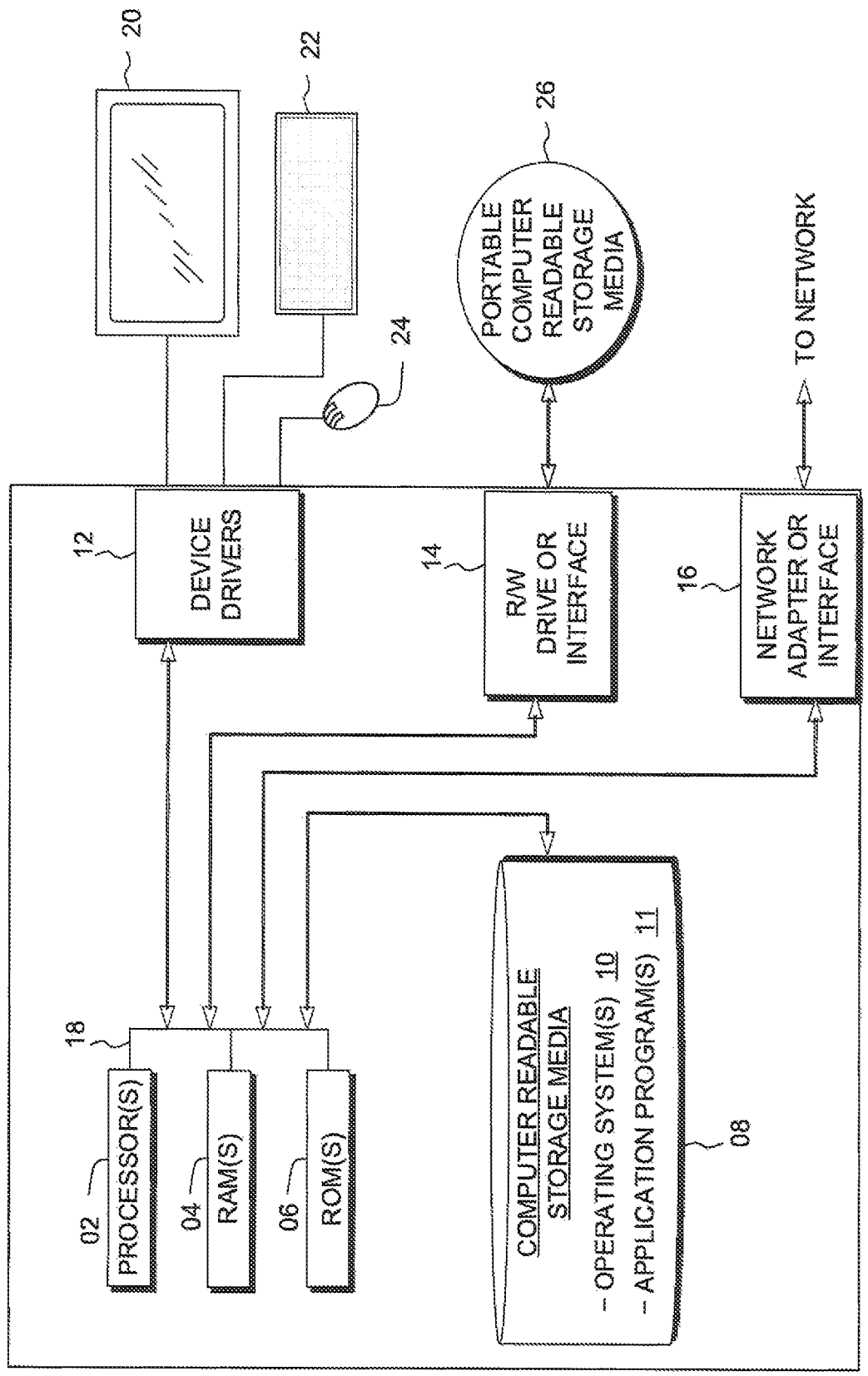
FIG. 7 illustrates a block diagram depicting hardware components of that may be used to implement the solution according to an embodiment of the present disclosure.

FIG. 7 depicts a block diagram of components that may be used to implement the solution according to embodiments of the present disclosure. It should be appreciated that FIG. 7 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
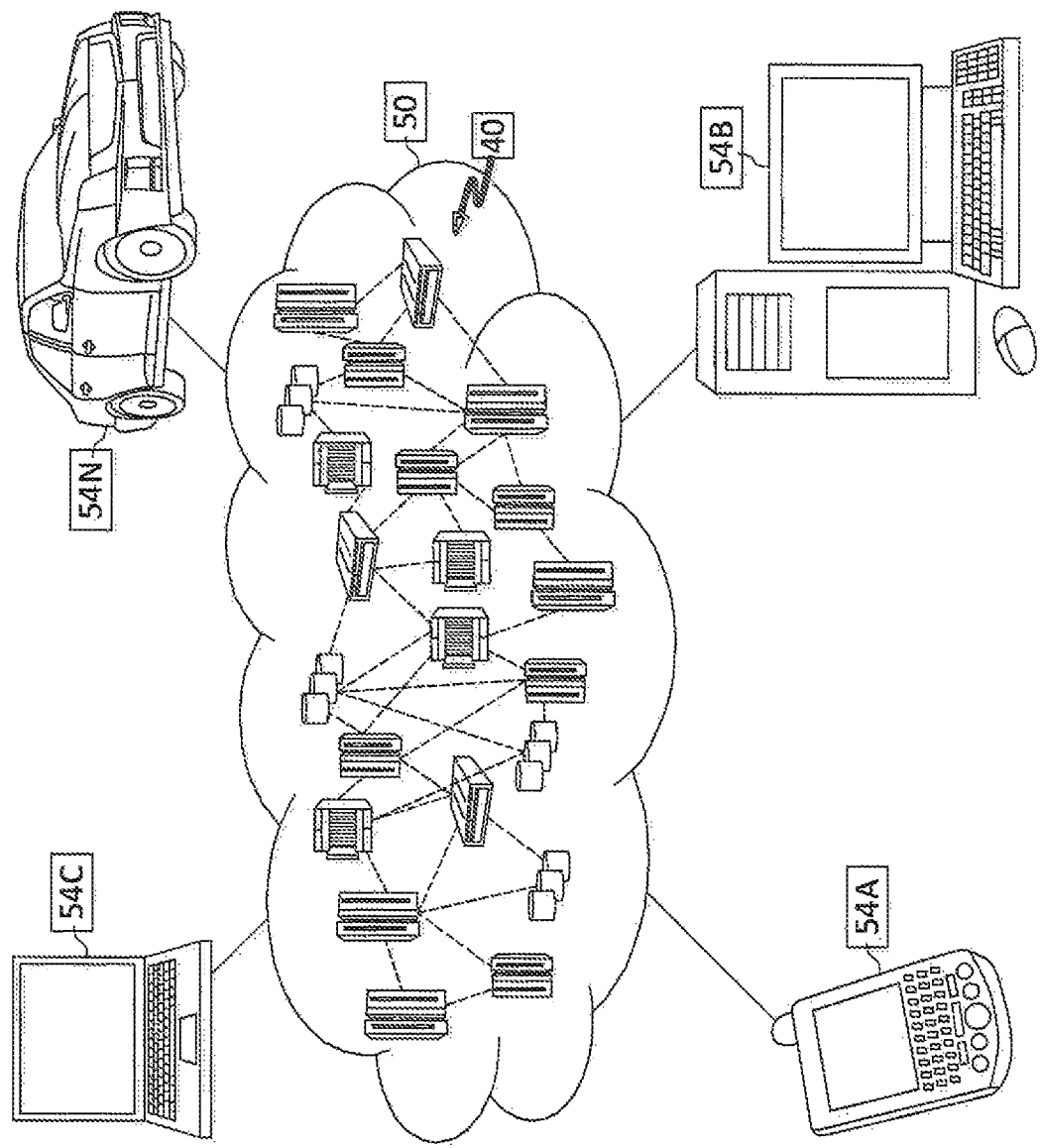
FIG. 8 depicts a cloud computing environment according to an embodiment of the present disclosure.

Referring now to FIG. 8, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 40 and cloud computing environment 50 can communicate with any type of computerized device over any type of network and/or network addressable connection (e.g., using a web browser).

Figure 9:
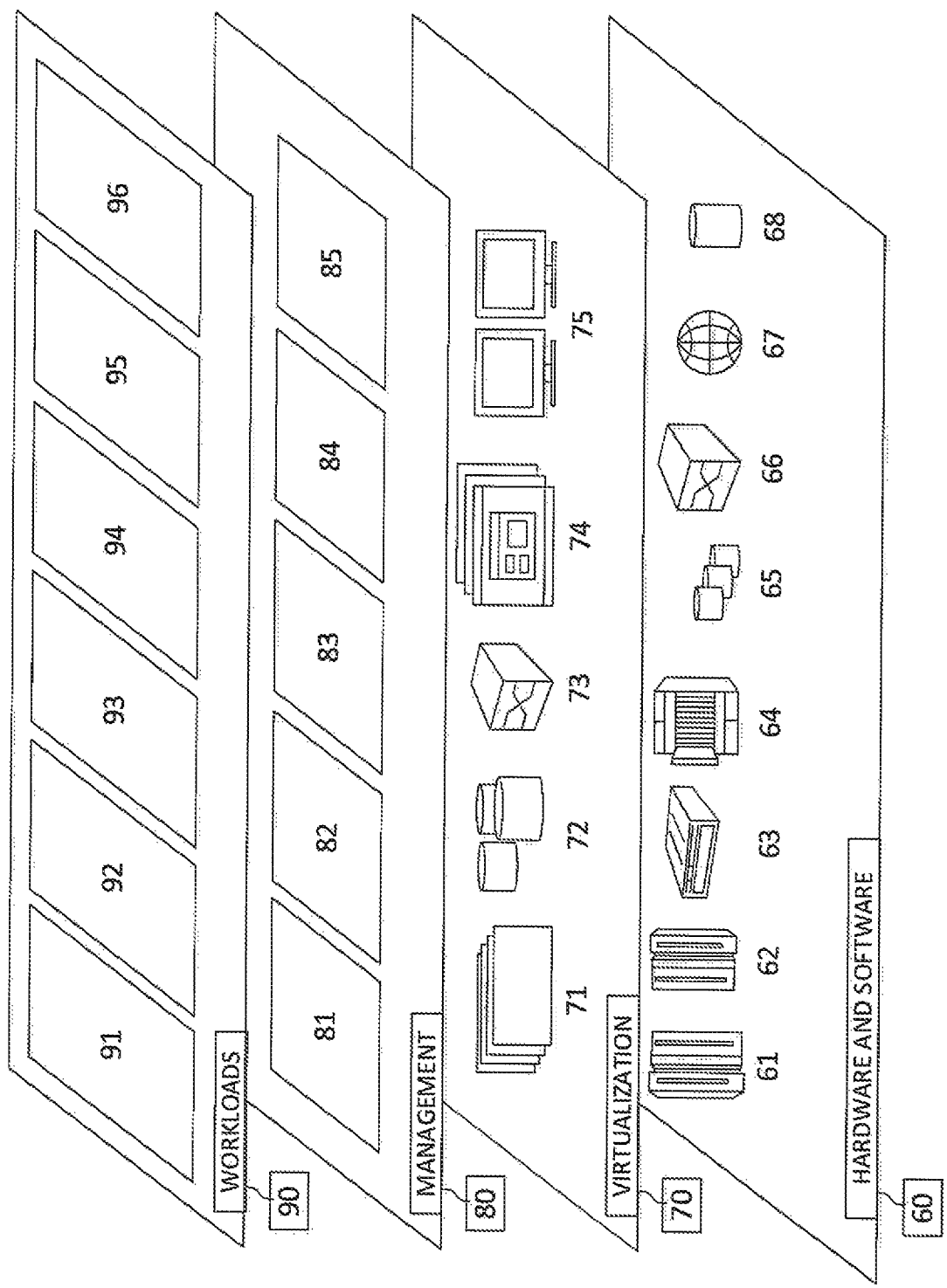
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, the terms "substantially", "about", "approximately" and the like should be understood as "within 10%". Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for monitoring a quality of a conference call. However, the conference call may be of any type (for example, supporting the exchange of voice only or of one or more additional multimedia contents, such as videos, images, data, documents and so on) and it may be implemented over any telecommunication network (see below).

In an embodiment, the method comprises setting a client computing machine of a participant to the conference call to a mute mode. However, the client computing machine may be of any participant (for example, a person or a group thereof) and of any type (see below); moreover, the client computing machine may be set to the mute mode in any way (for example, manually, automatically either locally or in response to a remote command, and so on).

In an embodiment, the mute mode is for preventing input sounds being input to a microphone of the client computing machine to be transmitted to a server computing machine managing the conference call. However, this result may be achieved in any way (for example, by filtering the corresponding digital or analog signal, switching off the microphone and so on) so as to prevent the transmission of the input sounds at any level (for example, by completely suppressing them or at least by reducing their intensity below any threshold). Moreover, the server computing machine may be of any type (see below).

In an embodiment, the method comprises generating one or more test signals by the client computing machine in the mute mode. However, the test signals may be generated in any number and in any way (for example, periodically, random and so on).

In an embodiment, the test signals have corresponding test frequencies within a human audible range, but they are generated without audible effects on the participant. However, the test signals may have any test frequencies within any audible range and they may be generated to have no audible effects on the participant in any way (for example, resulting from the distortion of sounds with frequencies outside the human audible range, synthetized within the client computing machine, without the emission of any sound in the human audible range, with the emission of sounds in the human audible range having intensities below any threshold and so on).

In an embodiment, the method comprises transmitting the test signals from the client computing machine to the server computing machine. However, the test signals may be transmitted in any way (for example, via the conference agent as usual, directly by the test agent and so on).

In an embodiment, the transmission of the test signals causes the server computing machine to verify the quality of the conference call for the participant according to a comparison of one or more received signals (being received from the client computing machine) with the test signals. However, the quality may be verified in any way (for example, by determining whether the quality reaches a satisfactory level, an acceptable level and so on, or any combination thereof).

In an embodiment, the transmission of the test signals causes the server computing machine to prevent the test signals to be transmitted to one or more further client computing machines of further participants to the conference call. However, this result may be achieved in any way (for example, by filtering the received signals when they are broadcast indiscriminately, by broadcasting the received signals only when the client computing machine is not in the mute mode and so on) so as to prevent the transmission of the test signals at any level (for example, by completely suppressing them or at least by reducing their intensity below any threshold); moreover, the further client computing machines may be in any number and of any type (see below).

In an embodiment, said step of generating the test signals comprises (for each of the test signals) emitting a precursor sound with a loudspeaker of the client computing machine. However, the precursor sound may be emitted with any loudspeaker (for example, the same used by the participant to perform the conference call, a dedicated one such as of ultrasound type and so on).

In an embodiment, the precursor sound comprises one or more components having corresponding precursor frequencies outside the human audible range. However, the precursor sound may comprise any number and type of components (for example, pure tones, complex tones and so on); moreover, the precursor frequencies may be of any values outside the human audible range (for example, above and/or below it).

In an embodiment, said step of generating the test signals comprises (for each of the test signals) recording the precursor sound with the microphone. However, the precursor sound may be recorded with any microphone (for example, the same used by the participant to perform the conference call, a dedicated one and so on).

In an embodiment, said step of generating the test signals comprises (for each of the test signals) converting the precursor sound by the microphone into a precursor signal that is distorted to comprise the test signal. However, the precursor signal may be distorted in any way (for example, with harmonic distortion, amplitude distortion, frequency response distortion and so on, or any combination thereof).

In an embodiment, said step of generating the test signals comprises (for each of the test signals) configuring the mute mode to pass the test frequency. However, this result may be achieved in any way (for example, with a digital filter, an analogue filter and so on, by leaving unaffected or at least limiting the attenuation of the test frequency below any threshold).

In an embodiment, said step of generating the test signals comprises (for each of the test signals) emitting the precursor sound comprising a first precursor tone and a second precursor tone with the loudspeaker of the client computing machine. However, the precursor tones may be of any type (for example, with any intensity, phase and so on).

In an embodiment, the first precursor tone and the second precursor tone have a first precursor frequency and a second precursor frequency, respectively, higher than the human audible range. However, the first and second precursor frequencies may be of any values.

In an embodiment, a difference between the second precursor frequency and the first precursor frequency is comprised within the human audible range. However, the difference between the first and second precursor frequencies may be of any value.

In an embodiment, said step of generating the test signals comprises (for each of the test signals) converting the precursor sound by the microphone into the precursor signal being distorted to comprise the test signal resulting from a combination of at least one harmonic component of the first precursor tone and at least one harmonic component of the second precursor tone. However, the test signal may result from any combination of any number and type of harmonic components of the first and second precursor tones (for example, the second harmonic component only, one or more harmonic components of any integer and/or non-integer order and so on, or any combination thereof).

In an embodiment, the method comprises receiving an indication of the test frequencies from the server computing machine by the client computing machine. However, the test frequencies may be indicated in any way (for example, by their values, any rule for determining them and so on) and their indication may be received in any way (for example, whenever the client computing machine switches to the mute mode, only once at the entering of the participant into the conference call and so on); in any case, the test frequencies may also be determined locally and transmitted to the server computing machine or more generally pre-determined in any way to be known to both the client computing machine and the server computing machine.

In an embodiment, the test frequencies are set by the server computing machine to be unique for the client computing machine during the conference call. However, the test frequencies may be set in any way (for example, random, as a function of characterizing features of the client computing machine and so on). In any case, the possibility of having the same test frequency for two or more client computing machines, up to all (at least at certain instants) is not excluded.

In an embodiment, the method comprises changing the test frequencies by the client computing machine over time. However, the test frequencies may be changed in any way (for example, random, deterministic, with or without the possibility of repetitions and so on). In any case, the possibility of using a fixed test frequency is not excluded.

In an embodiment, the method comprises receiving an indication of a hopping schema from the server computing machine by the client computing machine. However, the hopping schema may be indicated in any way (for example, by a seed value for a pre-defined changing algorithm, a sequence of values or any other rule) and its indication may be received in any way (for example, whenever the client computing machine switches to the mute mode, only once at the entering of the participant into the conference call and so on); in any case, the hopping schema may also be determined locally and transmitted to the server computing machine or more generally pre-determined in any way to be known to both the client computing machine and the server computing machine.

In an embodiment, the hopping schema is set by the server computing machine to have the test frequencies unique for the client computing machine during the conference call. However, the hopping schema may be set in any way (for example, random, deterministic and so on). In any case, the possibility that the hopping schema provides the same test frequency for two or more client computing machines, up to all (at least at certain instants) is not excluded.

In an embodiment, the method comprises changing the test frequencies by the client computing machine according to the hopping schema. However, the test frequencies may be changed in any way (for example, by reading them, calculating them and so on).

In an embodiment, the method comprises modulating the test signals according to a test message by the client computing machine. However, the test signals may be modulated in way (for example, in amplitude, phase and so on) according to any test message (for example, fixed, depending on the client computing machine and so on). In any case, the possibility of using steady test signals is not excluded.

In an embodiment, the modulation of the test signals causes the server computing machine to demodulate the received signals thereby recovering a content thereof. However, the received signals may be demodulated in any way (according to the modulation of the test signals).

In an embodiment, the modulation of the test signals causes the server computing machine to verify the quality of the conference call for the participant further according to a comparison of the content of the received signals with the test message. However, the quality may be verified in any way (for example, by considering the content of the received signals as is or possibly correcting it according to corresponding redundancy information, by discarding the received signals whenever their content is not exactly the same as the test message or tolerating a certain difference, such as in a maximum number of bits, and so on).

In an embodiment, the method comprises receiving a low quality indication of the conference call for the participant from the server computing machine by the client computing machine. However, the low quality indication may be of any type (for example, a fixed text, comprising any quality index and so on).

In an embodiment, the low quality indication is received in response to the quality of the conference call for the participant being verified by the server computing machine not reaching a satisfactory level. However, this condition may be verified in any way (for example, according to the cut range of frequencies, any level of compliance to any SLA and/or the number of test signals found in the received signals and possibly having their content matching the test massage in any way, according to any quality index based thereon not reaching any threshold and so on).

In an embodiment, the method comprises outputting a warning message according to the low quality indication by the client computing machine. However, the warning message may be of any type (for example, fixed, depending on the low quality indication and so on) and it may be output in any way (for example, with a pop-up window, a notification, a sound and so on, or any combination thereof).

In an embodiment, the method comprises receiving a closure of the conference call for the participant from the server computing machine by the client computing machine. However, the closure of the conference call may be received in any way (for example, simply aborting the conference call, preceding it with a warning message of any type as above and so on).

In an embodiment, the closure is received in response to the quality of the conference call for the participant being verified by the server computing machine not reaching an acceptable level. However, this condition may be verified in any way (for example, when no test signal possibly having its content matching the test massage in any way has been found in the received signals, according to any level of non-compliance to any SLA, when any quality index as above does not reach any threshold, and so on).

Another embodiment provides a method for monitoring a quality of a conference call, wherein the method comprises: receiving one or more received signals from each of a plurality of client computing machines of corresponding participants to the conference call by a server computing machine managing the conference call, the received signals resulting from one or more test signals (having corresponding test frequencies within a human audible range) being generated by the client computing machine (set to a mute mode for preventing input sounds being input to a microphone of the client computing machine to be transmitted to the server computing machine) without audible effects on the corresponding participant and being transmitted by the client computing machine to the server computing machine; verifying the quality of the conference call for each of the participants by the server computing machine according to a comparison of the received signals of the client computing machine of the participant in the mute mode with the corresponding test signals; and preventing the test signals of each of the client computing machines to be transmitted to other ones of the client computing machines by the server computing machine.

Another embodiment provides a method for monitoring a quality of a conference call, wherein the method comprises: setting each of a plurality of client computing machines of corresponding participants to the conference call to a mute mode for preventing input sounds being input to a microphone of the client computing machine to be transmitted to a server computing machine managing the conference call; generating one or more test signals by each of the client computing machines in the mute mode without audible effects on the corresponding participant, the test signals having corresponding test frequencies within a human audible range; transmitting the test signals from each of the client computing machines in the mute mode to the server computing machine; verifying the quality of the conference call for each of the participants by the server computing machine according to a comparison of one or more received signals being received from the client computing machine of the participant in the mute mode with the corresponding test signals; and preventing the test signals of each of the client computing machines to be transmitted to other ones of the client computing machines by the server computing machine.

However, those methods may be implemented in any way (as above).

Generally, similar considerations apply if the same solution is implemented with equivalent methods (by using similar steps with the same functions of more steps or portions thereof, removing some non-essential steps or adding further optional steps); moreover, the steps may be performed in a different order, concurrently or in an interleaved way (at least in part).

Further embodiments provide corresponding computer programs configured for causing a client computing machine of a participant to a conference call, a server computing machine for managing a conference call, and a computing system comprising a server computing machine for managing a conference call and a plurality of client computing machines of corresponding participants to the conference call, respectively, to perform the corresponding method when the computer program is executed thereon.

Further embodiments provide corresponding computer program products for monitoring a quality of a conference call, each computer program product comprising a computer readable storage medium having program instructions embodied therewith, the program instructions executable by the client computing machine, the server computing machine and the computing system, respectively, to cause it to perform the corresponding method.

However, each software program (and the corresponding product) may be implemented as a stand-alone module, as a plug-in for a pre-existing software program (for example, the conference agent, the conference manager or the conference application), or even directly in the latter; it would be readily apparent that it is also possible to deploy the same solution as a service that is accessed via the telecommunication network (such as in the Internet). Moreover, the computer programs may be executed on any computing machine/system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a client computing machine of a participant to a conference call, wherein the client computing machine comprises: a microphone for inputting input sounds; a muting circuit for setting the client computing machine to a mute mode for preventing the input sounds to be transmitted to a server computing machine managing the conference call; a test circuit for generating one or more test signals in the mute mode without audible effects on the participant, the test signals having corresponding test frequencies within a human audible range; and a transmitter for transmitting the test signals to the server computing machine to cause the server computing machine to verify the quality of the conference call for the participant according to a comparison of one or more received signals being received from the client computing machine with the test signals and to prevent the test signals to be transmitted to one or more further client computing machines of further participants to the conference call.

An embodiment provides a server computing machine for managing a conference call, wherein the server computing machine comprises: a receiver for receiving one or more received signals from each of a plurality of client computing machines of corresponding participants to the conference, the received signals resulting from one or more test signals (having corresponding test frequencies within a human audible range) being generated by the client computing machine (set to a mute mode for preventing input sounds being input to a microphone of the client computing machine to be transmitted to the server computing machine) without audible effects on the corresponding participant and being transmitted by the client computing machine to the server computing machine; a verification circuit for verifying the quality of the conference call for each of the participants according to a comparison of the received signals of the client computing machine of the participant in the mute mode with the corresponding test signals; and a prevention circuit for preventing the test signals of each of the client computing machines to be transmitted to other ones of the client computing machines.

An embodiment provides a system for performing a conference call, wherein the system comprises the above-mentioned server computing machine for managing the conference call and a plurality of the above-mentioned client computing machines of corresponding participants to the conference call.

However, each computing machine/system may be of any type (for example, in the case of each client computing machine a laptop, a smartphone, a tablet, a desktop computer and so on, with any microphone and loudspeaker, such as integrated or external, either separate or combined into a headphone, in the case of the server computing machine a physical machine, a virtual machine, a cloud infrastructure and so, and in the case of the computing system the server computing machine with any number of client computing machines communicating among them over any local area, wide area, global, mobile or satellite telecommunication network using any kind of wired or wireless connections).

Generally, similar considerations apply if each client computing machine, the server computing machine and the computing system each has a different structure, comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-described features may be combined in any way. For example, possible combination of the features of the claims may be the following: claim 2 with claim 1, claim 3 with claim 2, claim 4 with any claim from 1 to 3, claim 5 with any claim from 1 to 4, claim 6 with claim 5, claim 7 with any claim from 1 to 6, claim 8 with any claim from 1 to 7, claim 9 with any claim from 1 to 8, claim 10 with instructions for performing the method of any claim from 1 to 9, and claim 11 with means (or a circuitry) for performing each step of any claim from 1 to 9.

The invention claimed is:

1. A method for monitoring a quality of a conference call, wherein the method comprises:
setting a client computing machine of a participant to the conference call to a mute mode for preventing input sounds being input to a microphone of the client computing machine to be transmitted to a server computing machine managing the conference call;
generating one or more test signals by the client computing machine in the mute mode without audible effects on the participant and having corresponding test frequencies within a range of 10 Hz to 30 kHz, wherein generating the one or more test signals further comprises, for each of the test signals:
emitting a precursor sound comprising a first precursor tone and a second precursor tone having corresponding frequencies outside the human audible range with the loudspeaker of the client computing machine, the first precursor tone and the second precursor tone having a first precursor frequency and a second precursor frequency, respectively, higher than the human audible range with a difference between the second precursor frequency and the first precursor frequency comprised within the human audible range;
recording the precursor sound with the microphone, wherein the precursor sound is distorted by the microphone due to non-linearity of the one or more components having precursor frequencies outside the human audible range;
converting the precursor sound by the microphone into the precursor signal being distorted to comprise the test signal resulting from a combination of at least one harmonic component of the first precursor tone and at least one harmonic component of the second precursor tone;
configuring the mute mode to pass the test frequency; and
transmitting the test signals from the client computing machine to the server computing machine to cause the server computing machine to verify the quality of the conference call for the participant according to a comparison of one or more received signals being received from the client computing machine with the test signals and to prevent the test signals to be transmitted to one or more further client computing machines of further participants to the conference call.

2. The method according to claim 1, wherein the method further comprises:
receiving an indication of the test frequencies from the server computing machine by the client computing machine, the test frequencies being set by the server computing machine to be unique for the client computing machine during the conference call.

3. The method according to claim 1, wherein the method further comprises:
modulating the test signals according to a test message by the client computing machine to cause the server computing machine to demodulate the received signals thereby recovering a content thereof and to verify the quality of the conference call for the participant further according to a comparison of the content of the received signals with the test message.

4. The method according to claim 1, wherein the method further comprises:
receiving a low quality indication of the conference call for the participant from the server computing machine by the client computing machine in response to the quality of the conference call for the participant being verified by the server computing machine not reaching a satisfactory level; and
outputting a warning message according to the low quality indication by the client computing machine.

5. The method according to claim 1, wherein the method further comprises:
receiving a closure of the conference call for the participant from the server computing machine by the client computing machine in response to the quality of the conference call for the participant being verified by the server computing machine not reaching an acceptable level.

6. A computer program product for monitoring a quality of a conference call, the computer program product comprising a computer readable storage medium having program instructions embodied therewith, the program instructions executable by a client computing machine of a participant to the conference call to cause the client computing machine to perform a method comprising:
setting the client computing machine to a mute mode for preventing input sounds being input to a microphone of the client computing machine to be transmitted to a server computing machine managing the conference call;
generating one or more test signals in the mute mode without audible effects on the participant and having corresponding test frequencies within a range of 10 Hz to 30 kHz, wherein generating the one or more test signals further comprises, for each of the test signals:
emitting a precursor sound comprising a first precursor tone and a second precursor tone having corresponding frequencies outside the human audible range with the loudspeaker of the client computing machine, the first precursor tone and the second precursor tone having a first precursor frequency and a second precursor frequency, respectively, higher than the human audible range with a difference between the second precursor frequency and the first precursor frequency comprised within the human audible range;
recording the precursor sound with the microphone, wherein the precursor sound is distorted by the microphone due to non-linearity of the one or more components having precursor frequencies outside the human audible range;
converting the precursor sound by the microphone into the precursor signal being distorted to comprise the test signal resulting from a combination of at least one harmonic component of the first precursor tone and at least one harmonic component of the second precursor tone;
configuring the mute mode to pass the test frequency; and
transmitting the test signals to the server computing machine to cause the server computing machine to verify the quality of the conference call for the participant according to a comparison of one or more received signals being received from the client computing machine with the test signals and to prevent the test signals to be transmitted to one or more further client computing machines of further participants to the conference call.

7. The computer program product according to claim 6, wherein the method further comprises:
receiving an indication of the test frequencies from the server computing machine by the client computing machine, the test frequencies being set by the server computing machine to be unique for the client computing machine during the conference call.

8. The computer program product according to claim 6, wherein the method further comprises:
modulating the test signals according to a test message by the client computing machine to cause the server computing machine to demodulate the received signals thereby recovering a content thereof and to verify the quality of the conference call for the participant further according to a comparison of the content of the received signals with the test message.

9. The computer program product according to claim 6, wherein the method further comprises:
receiving a low quality indication of the conference call for the participant from the server computing machine by the client computing machine in response to the quality of the conference call for the participant being verified by the server computing machine not reaching a satisfactory level; and
outputting a warning message according to the low quality indication by the client computing machine.

10. The computer program product according to claim 6, wherein the method further comprises:
receiving a closure of the conference call for the participant from the server computing machine by the client computing machine in response to the quality of the conference call for the participant being verified by the server computing machine not reaching an acceptable level.

11. A computer system for monitoring a quality of a conference call, the computer system comprising:
one or more computer processors, one or more computer-readable storage media, and program instructions stored on one or more of the computer-readable storage media for execution by at least one of the one or more processors capable of performing a method, the method comprising:
setting the client computing machine to a mute mode for preventing input sounds being input to a microphone of the client computing machine to be transmitted to a server computing machine managing the conference call;
generating one or more test signals in the mute mode without audible effects on the participant and having corresponding test frequencies within a range of 10 Hz to 30 kHz, wherein generating the one or more test signals further comprises, for each of the test signals:
emitting a precursor sound comprising a first precursor tone and a second precursor tone having corresponding frequencies outside the human audible range with the loudspeaker of the client computing machine, the first precursor tone and the second precursor tone having a first precursor frequency and a second precursor frequency, respectively, higher than the human audible range with a difference between the second precursor frequency and the first precursor frequency comprised within the human audible range;
recording the precursor sound with the microphone, wherein the precursor sound is distorted by the microphone due to non-linearity of the one or more components having precursor frequencies outside the human audible range;
converting the precursor sound by the microphone into the precursor signal being distorted to comprise the test signal resulting from a combination of at least one harmonic component of the first precursor tone and at least one harmonic component of the second precursor tone;
configuring the mute mode to pass the test frequency; and
transmitting the test signals to the server computing machine to cause the server computing machine to verify the quality of the conference call for the participant according to a comparison of one or more received signals being received from the client computing machine with the test signals and to prevent the test signals to be transmitted to one or more further client computing machines of further participants to the conference call.

12. The computer system according to claim 11, wherein the method further comprises:
receiving an indication of the test frequencies from the server computing machine by the client computing machine, the test frequencies being set by the server computing machine to be unique for the client computing machine during the conference call.

13. The computer system according to claim 11, wherein the method further comprises:
modulating the test signals according to a test message by the client computing machine to cause the server computing machine to demodulate the received signals thereby recovering a content thereof and to verify the quality of the conference call for the participant further according to a comparison of the content of the received signals with the test message.

14. The computer system according to claim 11, wherein the method further comprises:
receiving a low quality indication of the conference call for the participant from the server computing machine by the client computing machine in response to the quality of the conference call for the participant being verified by the server computing machine not reaching a satisfactory level; and
outputting a warning message according to the low quality indication by the client computing machine.

* * * * *